United States Patent [19]
Lien

[11] 3,911,869
[45] Oct. 14, 1975

[54] FEED BUNK SUPPORT
[76] Inventor: Charles R. Lien, 511 W. 1st St., Holdrege, Nebr. 68949
[22] Filed: Jan. 17, 1974
[21] Appl. No.: 434,348

[52] U.S. Cl. ................................. 119/61; 256/11
[51] Int. Cl.² ............................................ A01K 5/01
[58] Field of Search ............ 119/61, 57 B, 52, 52 R, 119/20

[56] References Cited
UNITED STATES PATENTS

| | | | |
|---|---|---|---|
| 1,873,297 | 8/1932 | Davenport | 119/61 |
| 2,316,463 | 4/1943 | Skulina | 119/61 |
| 2,574,174 | 11/1951 | Dyrdahl | 119/61 |
| 2,807,234 | 9/1957 | Middlen | 119/51 R |

Primary Examiner—Louis G. Mancene
Assistant Examiner—Peter K. Skiff
Attorney, Agent, or Firm—Henderson & Strom

[57] ABSTRACT

A reinforced concrete feed bunk support having an upstanding fence supporting leg and a horizontal feed bunk supporting leg. A reinforced concrete feed bunk is positioned between the upstanding leg and the position of the animals to be fed from the feed bunk. The upstanding leg has an upper canted portion thereon with fence wire connecting loops thereon. Fencing wire is connected to the loops and extends over and above the feed bunk.

6 Claims, 3 Drawing Figures

FEED BUNK SUPPORT

BACKGROUND OF THE INVENTION

The present invention relates to a feed bunk support, and more particularly to a feed bunk support which supports the feed bunk and a fence in such a manner to prevent feeding animals from tipping over the feed bunk.

In providing a feeding station for livestock animals such as cattle, one of the major problems is to be able to store the feed which is to be fed over a period of time conveniently beside the feeding station without the danger that the feeding animals will get to this major supply of feed rather than just to the feed in a feed bunk at the feeding station. In general, this problem has been solved by allowing the feeding animals access only to a feed bunk, and providing an obstruction to the main supply of feed, which supply would normally be on the opposite side of the feed bunk from the feeding animals for the convenience of the feeding personnel. This general arrangement can be seen in U.S. Pat. No. 3,092,077, wherein a feed bunk has an access opening to which a feeding animal's head may be received, but wherein the access opening is too small for the animal to pass through completely.

Another problem confronted by those designing a feeding station is the one of preventing animals from stepping into the feed bunk, and thereby tipping over the feed bunk, causing feed to be wasted by spilling it on the ground, or otherwise contaminating the feed or degrading its quality.

SUMMARY OF THE INVENTION

The present invention relates to a feed bunk support having a horizontal feed bunk supporting leg and an upstanding fence supporting leg with a canted portion thereon extending over and above the feed bunk horizontal leg, whereby a feeding animal exerting pressure on the fence, cannot tip the feed bunk over by such pressure as would be possible if the upstanding leg was straight or canted in a direction away from the feed bunk.

An object of the present invention is to provide a feed bunk support which provides a stable feed bunk support structure.

Another object is to provide a feed bunk support which also supports a fence.

A further object of the invention is to provide a feed bunk and fence support which cannot be easily upset by a feeding animal.

Still another object is to provide a feed bunk support which accomplishes the other objects of the invention and can still be made of a molded construction at a reasonable cost.

Other objects, advantages, and novel features of the present invention will become apparent from the following detailed description of the invention when considered in conjunction with the accompanying drawings.

DESCRIPTION OF THE PREFERRED EMBODIMENT

Figure 1:
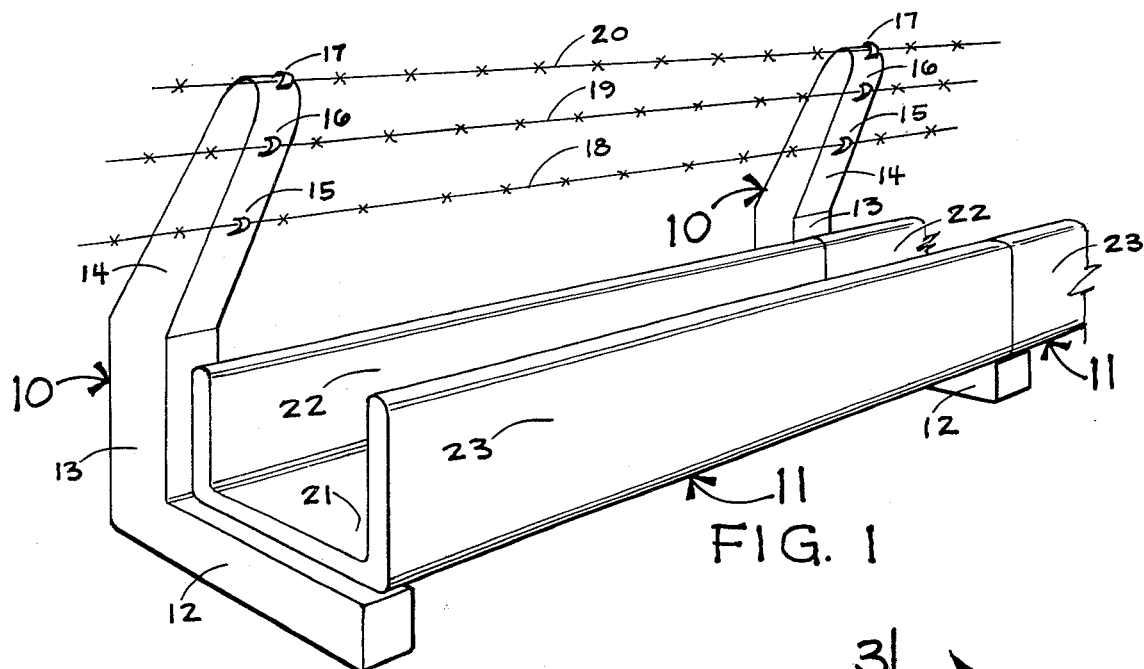
FIG. 1 is a perspective view of a feeding station constructed according to the instant invention.
Figure 2:
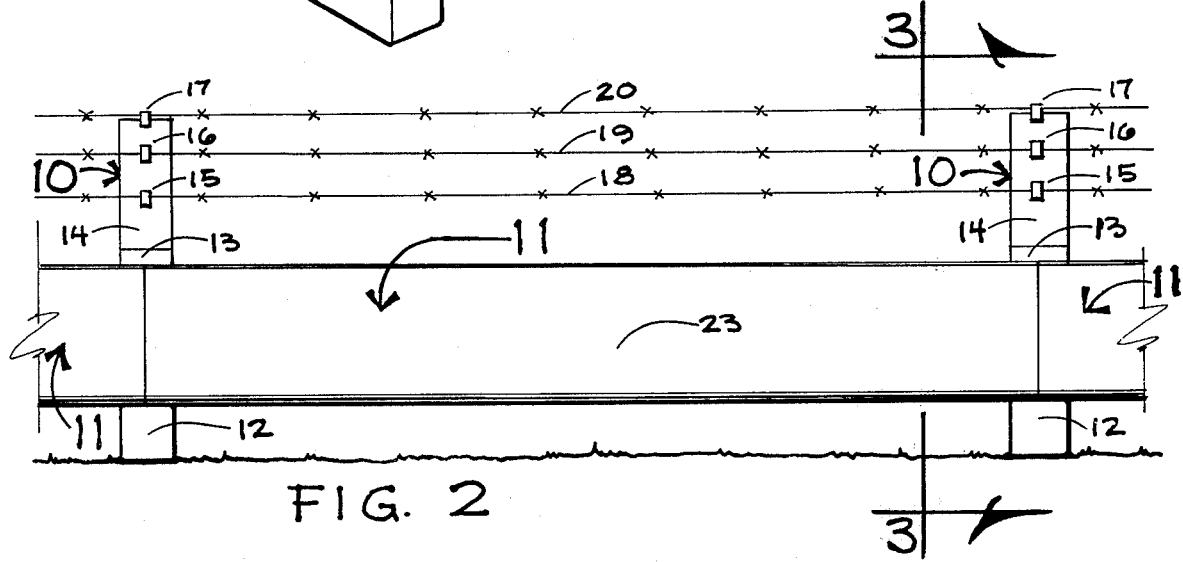
FIG. 2 is a front view of the feed bunk and the support of FIG. 1.
Figure 3:
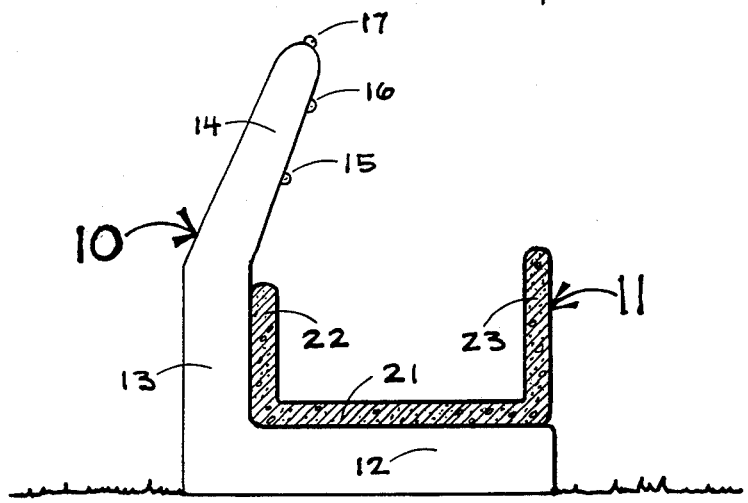
FIG. 3 is a cross sectional view taken along lines 3—3 of FIG. 2.

FIGS. 1–3 show a preferred embodiment of a feed bunk and the supporting structure. Each of the feed bunk supports 10 are identical, and are shown with identical feed bunk members 11 disposed thereon. The feed bunk members 11 rest on a horizontal leg 12 of a support 10 and also rest against an upstanding leg 13, in a preferred arrangement. A canted portion 14 of the upstanding leg 13 extends above and over the horizontal leg 12, generally in the same plane as the horizontal leg 12. Loop members 15, 16 and 17 on the canted portion 14 of upstanding leg 13 provide a means for fastening a fence to the support member 10.

Wires 18, 19 and 20 extend through loops 15, 16 and 17 respectively to thereby form a fence on the feed bunk structure. The fence so supported necessarily extends over and above the leg 12 and between the ends of leg 12, and because of the placement of the feed bunk 11, over and above the feed bunk 11. It will be understood to those skilled in this art that the fence so formed may be of any conventional structure, and not just of the barbed wire structure shown in the drawings; however, the present invention can utilize barbed wire whereas other feeding stations could not. For example it would be unwise to use barbed wire in place of obstruction 54 of U.S. Pat. No. 3,092,077, referred to above, or in any similar arrangement wherein an animal must push its head past the obstruction to gain access to the feed in a feed bunk.

The feed bunk members 11 have a bottom wall 21 which rests directly on the horizontal legs 12 of support members 10. Upstanding side wall 22 extends upwardly from the bottom 21 of the feed bunk member 11 and rests against a wall of the upstanding leg 13, as shown clearly in FIG. 3. A slightly longer upstanding wall 23 also extends upwardly from bottom wall 21 so as to provide access to the feed bunk by a feeding animal, but providing an obstacle for the feeding animal trying to step into the feed bunk 11 itself.

The feed bunks 11 are placed on horizontal legs 12, as shown clearly in FIGS. 1 and 2, so as to cover about half of the horizontal leg. By such an arrangement, it will be understood from FIGS. 1 and 2, that a continual feed bunk of any desired length may be formed by the appropriate placing of support members 10 and feed bunk members 11. Ends (not shown) may be formed on end feed bunk members 11, if desired. In addition, it will be noted that a very stable feeding station is produced, without the usual need to drive posts in the ground to support and stabilize such a feeding station. Instead, the support members and the feed bunks themselves may be molded, for example of reinforced concrete, to thereby eliminate the need for a more complicated structure. The sheer weight of the concrete members will hold the feeding station together, and thereby eliminates the need for expensive fastening devices, while producing an extremely stable structure.

Obviously many modifications and variations of the present invention are possible in light of the above teachings. For example, the feed bunk support 10 could be a continuous one, running the length of the feed bunks 11, rather than having a number of spaced feed bunk supports 10. Also, the fence supporting loops 15–17 could be of any number or configuration which will support a fence. It is therefore to be understood that, within the scope of the appended claims, the invention may be practiced otherwise than as specifically described.

I claim:
1. A feed bunk support comprising:
   a substantially horizontal leg having a bottom surface which engages the ground and an upper surface supporting a feed bunk above the ground;
   a substantially vertical leg connected at one end to one end of said horizontal leg;
   a canted leg secured on one end to the other end of said vertical leg with the other end thereof angled toward the feed bunk and positioned over said horizontal leg and above the feed bunk; and
   connecting means secured to said canted leg for receiving a fence which extends laterally of said horizontal leg and above the feed bunk, said means being disposed vertically above said horizontal leg and intermediate the ends of said horizontal leg.
2. A feed bunk support as defined in claim 1 wherein said connecting means comprises at least one loop connected to said canted leg.
3. A feed bunk support as defined in claim 1 wherein said connecting means comprises a plurality of spaced loops connected to said canted leg.
4. A feed bunk support as defined in claim 3 wherein said horizontal leg, vertical leg and canted leg are integral.
5. A feed bunk support as defined in claim 1 wherein said feed bunk support is made substantially of concrete.
6. A feed bunk support as defined in claim 1 wherein said feed bunk support is made substantially of reinforced concrete.

* * * * *